US011005255B2

(12) United States Patent
An et al.

(10) Patent No.: US 11,005,255 B2
(45) Date of Patent: May 11, 2021

(54) COMPLEX MULTIFUNCTIONAL RELAY SYSTEM AND CONTROL METHOD THEREFOR

(71) Applicant: WELLIM INC., Busan (KR)

(72) Inventors: Sun-Tae An, Yangsan-si (KR); James William Masten, Jr., Seattle, WA (US)

(73) Assignee: ACMEX ALMAZ Co., Ltd., Cheongju-si (KR)

( * ) Notice: Subject to any disclaimer, the term of this patent is extended or adjusted under 35 U.S.C. 154(b) by 70 days.

(21) Appl. No.: 16/490,423

(22) PCT Filed: Oct. 24, 2017

(86) PCT No.: PCT/KR2017/011754
§ 371 (c)(1),
(2) Date: Aug. 30, 2019

(87) PCT Pub. No.: WO2018/159914
PCT Pub. Date: Sep. 7, 2018

(65) Prior Publication Data
US 2020/0244061 A1    Jul. 30, 2020

(30) Foreign Application Priority Data

Mar. 2, 2017    (KR) .................... 10-2017-0027289

(51) Int. Cl.
*H02H 3/16*    (2006.01)
*H02H 3/08*    (2006.01)
(Continued)

(52) U.S. Cl.
CPC .......... *H02H 3/162* (2013.01); *G05B 19/042* (2013.01); *H02H 1/0015* (2013.01); *H02H 3/10* (2013.01); *H02H 3/08* (2013.01)

(58) Field of Classification Search
CPC ................................ H02H 3/08; H02H 3/162
(Continued)

(56) References Cited

U.S. PATENT DOCUMENTS 5,222,009 A *   6/1993   Scharnick ............ H02H 7/0822
                                            318/782
8,514,529 B1 *  8/2013   McMahon ............ H02H 3/338
                                            361/42
(Continued)

FOREIGN PATENT DOCUMENTS

JP          2831806       12/1998
KR      1995-0020841      7/1995
(Continued)

OTHER PUBLICATIONS

International Search Report with English translation corresponding to International Application No. PCT/KR2017/011754, dated Feb. 1, 2018.
(Continued)

*Primary Examiner* — Gary A Nash
(74) *Attorney, Agent, or Firm* — Kile Park Reed & Houtteman PLLC

(57) ABSTRACT

Provided are a complex multifunctional relay system capable of complexly performing an overcurrent blocking function, an arc blocking function, and an earth leakage blocking function by a relay circuit, and a control method therefor. The complex multifunctional relay system includes an AC circuit including a hot line and a neutral line, a power control means connected in parallel to the hot line, insulation differential amplifiers circuit-connected to the hot line and the neutral line through current shunts, a microprocessor connected to the power control means and the insulation differential amplifiers to perform monitoring and control the power supply of the power control means, a first comparator connected to the current shunt and the insulation differential
(Continued)

amplifier and connected to the microprocessor so as to check ground fault, and a second comparator connected between the current shunt/the insulation differential amplifier and the microprocessor so as to check arc fault.

10 Claims, 2 Drawing Sheets

(51) Int. Cl.
  *G05B 19/042* (2006.01)
  *H02H 1/00* (2006.01)
  *H02H 3/10* (2006.01)

(58) Field of Classification Search
  USPC .......................................... 361/42, 93.1, 100
  See application file for complete search history.

(56) References Cited

U.S. PATENT DOCUMENTS

| | | | | |
|---|---|---|---|---|
| 2005/0237680 | A1* | 10/2005 | Egner | ...................... H02H 3/20 361/42 |
| 2006/0018059 | A1 | 1/2006 | Elms et al. | |
| 2011/0216452 | A1* | 9/2011 | Haines | ..................... H02H 3/00 361/42 |
| 2012/0257314 | A1* | 10/2012 | Armstrong | ............. H02H 3/162 361/42 |
| 2015/0109077 | A1* | 4/2015 | Tomimbang | ......... H02H 1/0015 335/7 |

FOREIGN PATENT DOCUMENTS

| | | |
|---|---|---|
| KR | 1998-0026204 | 7/1998 |
| KR | 10-0423886 | 3/2004 |
| KR | 2009-0065675 | 6/2009 |
| KR | 10-0956162 | 5/2010 |
| KR | 10-1455782 | 11/2014 |

OTHER PUBLICATIONS

Written Opinion with English translation corresponding to International Application No. PCT/KR2017/011754, dated Feb. 1, 2018.

* cited by examiner

COMPLEX MULTIFUNCTIONAL RELAY SYSTEM AND CONTROL METHOD THEREFOR

TECHNICAL FIELD

The present disclosure relates to a complex multifunctional relay system which allows various functions to be complexly performed at the same time by a relay circuit in which analog circuits and digital circuits are mixed when power is transmitted to a load such as a motor via a relay, and a control method therefor.

BACKGROUND ART

In general, when AC power is supplied from a power input terminal to a load such as a motor, a relay is used when control of a circuit operation is required in an electric circuit, and various control functions are individually performed by a relay circuit or a separate electric circuit.

According to the following Patent Documents, technologies for an earth leakage circuit breaker, an overcurrent circuit breaker, and an arc circuit breaker have been disclosed as control functions on an electric circuit, but all these control functions have been made individually to perform respective functions.

In recent years, some devices having a simple combination type of circuit including an earth leakage circuit breaker, an arc circuit breaker and the like have been developed, but since this is merely a simple combination of related two functions, there is a limitation in improving efficiency. Therefore, it is necessary to provide a technology capable of complexly implementing various functions by a simple structure.

According to the following Patent Documents, technologies for an earth leakage circuit breaker, an overcurrent circuit breaker, and an arc circuit breaker have been disclosed as control functions on an electric circuit, but all these control functions have been made individually to perform respective functions.

In recent years, some devices having a simple combination type of circuit including an earth leakage circuit breaker, an arc circuit breaker and the like have been developed, but since this is merely a simple combination of related two functions, there is a limitation in improving efficiency. Therefore, it is necessary to provide a technology capable of complexly implementing various functions by a simple structure.

(Patent Document 1) KR 10-1995-0020841 A Jul. 26, 1995

(Patent Document 2) KR 10-1998-0026204 A Jul. 15, 1998

(Patent Document 3) KR 10-2009-0065675 A Jun. 23, 2009

DISCLOSURE

Technical Problem

Various embodiments are directed to combining analog circuits and digital circuits to make a hybrid circuit, thereby allowing a relay circuit to complexly perform various functions, such as an inductive load operation, an overcurrent blocking function, an arc blocking function, and an earth leakage blocking function, by a program of a microprocessor, as compared with related devices including a circuit or a device in which various functions are individually performed, or having a simply mixed function of a circuit or a device that performs two functions.

In addition, currents and frequency signals collected by current shunts installed in a hot line and a neutral line of an AC circuit are analyzed to allow the program of the microprocessor to arbitrarily manipulate and control the setting values of each function such as an earth leakage blocking value, an overcurrent blocking value, and an arc blocking value.

Technical Solution

In an embodiment, a complex multifunctional relay system includes a power control means including a plurality of triacs circuit-connected in parallel to a hot line of an AC circuit that receives AC power through an input terminal and supplies the AC power to a load and a mechanical relay circuit-connected between the triacs; a first insulation differential amplifier including a plurality of operational amplifiers circuit-connected through a first current shunt and a second insulation differential amplifier including a plurality of operational amplifiers circuit-connected through a second current shunt in order to compare and analyze currents and frequency signals of the hot line and a neutral line of the AC circuit; a microprocessor circuit-connected to the triacs in the power control means to control power supply by the mechanical relay and circuit-connected to the insulation differential amplifiers installed in the hot line and the neutral line of the AC circuit to monitor the currents and the frequency signals of the hot line and the neutral line; a first comparator connected for comparison to the first insulation differential amplifier connected to the hot line through the first current shunt and the second insulation differential amplifier connected to the neutral line through the second current shunt and connected to the microprocessor, and configured to check the occurrence of ground fault by comparing and detecting the currents flowing through the hot line and the neutral line; and a second comparator interposed between the first insulation differential amplifier connected to the hot line through the first current shunt and the microprocessor and configured to check occurrence of arc fault by comparing and detecting a voltage passing through the first current shunt of the hot line and an intermediate scale which is an approximate value of voltage swing of a representative signal of the first current shunt of the hot line, wherein the power control means is changed by adjusting setting values for each function by a program of the microprocessor. In addition, a pair of first LED and second LED are electrically connected to the microprocessor, and during occurrence of an inductive load operation, an overcurrent, an arc, and earth leakage, lighting of the first LED and lighting of the second LED occur differently.

In an embodiment, in a control method of a complex multifunctional relay system, a parallel circuit of triacs and a mechanical relay is configured by a combination of digital circuits and analog circuits, currents and frequency signals collected by a current shunt of a hot line and a current shunt of a neutral line of an AC circuit are analyzed based on a microprocessor, and the analyzed currents and frequency signals are compared with setting values for each function, which are settable in advance, by a program to control the mechanical relay of a power control means, so that various functions such as an inductive load operation, an overcurrent blocking function, an arc blocking function, and an earth leakage blocking function are complexly performed.

Advantageous Effects

According to the complex multifunctional relay system and the control method therefor of the present disclosure, a hybrid relay system can be implemented by combining digital circuits and analog circuits to complexly perform various functions. In such a case, the microprocessor continuously compares numerical values preset and stored with numerical values detected in realtime and immediately determines whether the current state of a corresponding part is normal or abnormal, so that it is possible to prevent malfunction of the motor serving as the load due to an overcurrent, earth leakage due to arc fault and ground fault, and the like or an abnormal operation and breakage of various circuit parts such as the microprocessor. As a consequence, it is possible to improve product functionality and provide differentiated performance with other products.

Moreover, the present disclosure is mainly characterized in that various functions, such as an inductive load operation, blocking of a motor starting overcurrent and an operating overcurrent, arc fault blocking, and earth leakage blocking, are performed by one relay system and the relay system is powered on to continuously check a current state all the time and immediately blocks a current flow by the mechanical relay when a problem occurs, thereby improving product durability by quickly responding to malfunction. As a consequence, it is possible to promote development in various industrial fields where the relay is used by increasing product responsiveness.

MODE FOR DISCLOSURE

A complex multifunctional relay system and a control method therefor of the present disclosure will be divided into the system and the control method and will be described in more detail by the circuit configuration diagram of FIG. 1 and the flowchart of FIG. 2.

Figure 1:
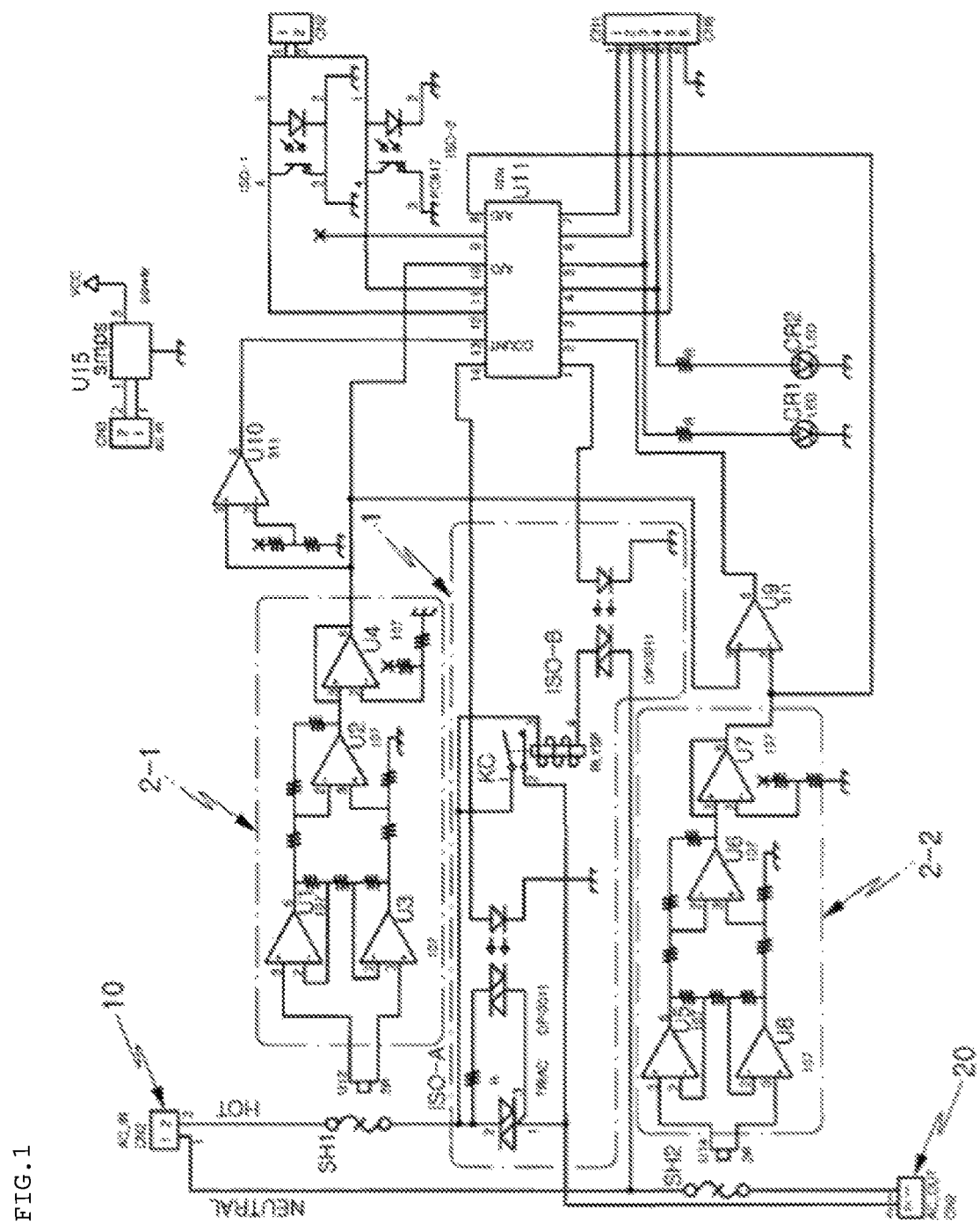
FIG. 1 is a circuit configuration diagram of a complex multifunctional relay system provided in the present disclosure.
Figure 2:
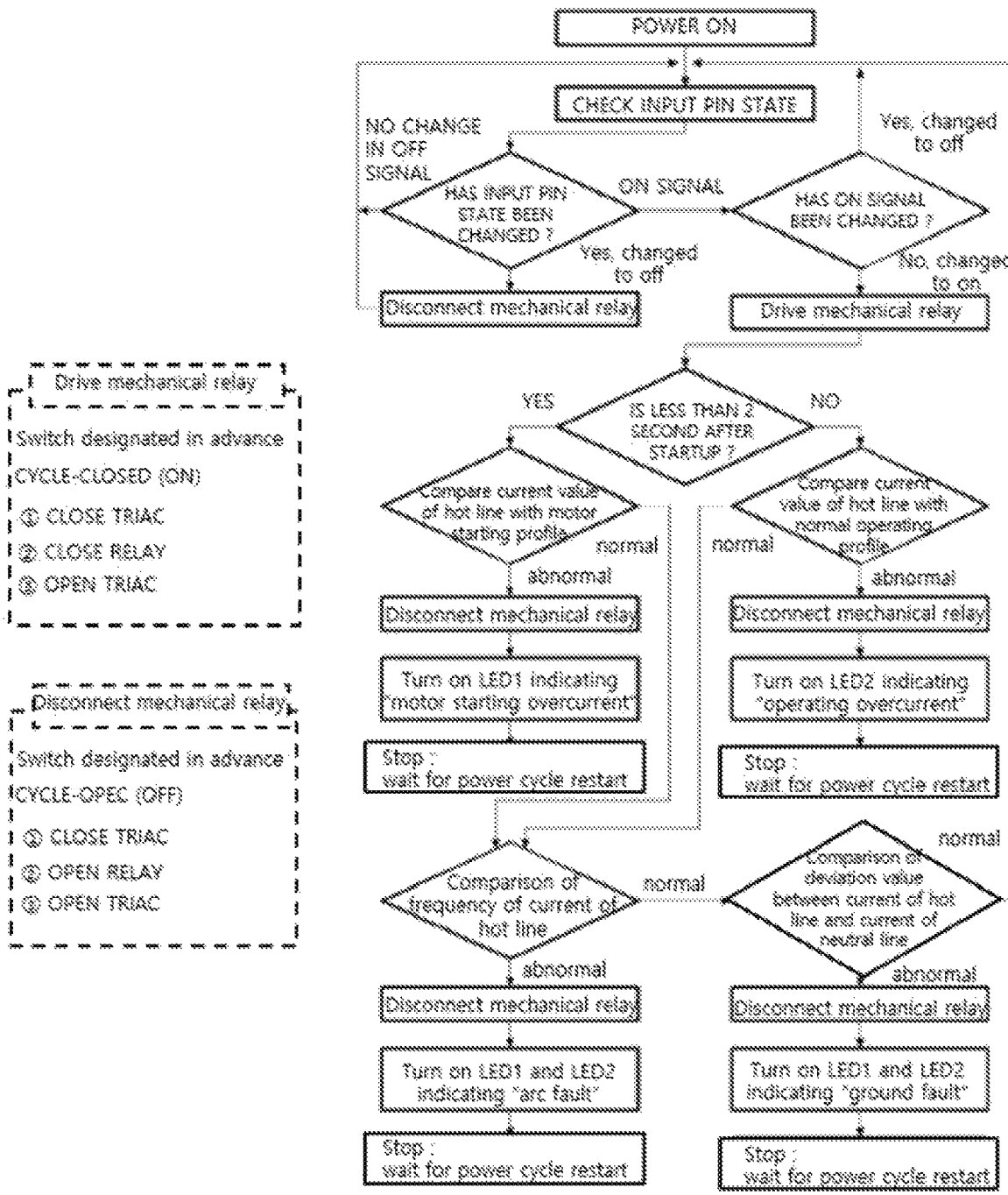
FIG. 2 is a flowchart sequentially illustrating a control method of the complex multifunctional relay system provided in the present disclosure.

First, as illustrated in FIG. 1, the complex multifunctional relay system of the present disclosure includes a power control means 1, which is connected to a hot line HOT and a neutral line NEUTRAL of an AC circuit that receives AC power through an input terminal 10 and supplies the AC power to a load 20 such as a motor, a pump, or various industrial machines and is connected in parallel to the hot line, insulation differential amplifiers 2-1 and 2-2 circuit-connected to the hot line HOT and the neutral line NEUTRAL through current shunts SH1 and SH2, and a microprocessor U11 connected to the power control means 1 and the insulation differential amplifiers 2-1 and 2-2 to perform monitoring and control the power supply of the power control means 1 according to the monitoring result.

The power control means 1 includes a triac (ISO-A) circuit-connected in parallel to the hot line HOT of the AC circuit, a triac (ISO-B) circuit-connected to the hot line HOT and the neutral line NEUTRAL, and a mechanical relay KC circuit-connected in parallel to the triac (ISO-A) when the mechanical relay KC is circuit-connected between the triacs (ISO-A) and (ISO-B).

The current shunts SH1 and SH2 and the insulation differential amplifiers 2-1 and 2-2 include a first current shunt SH1 connected to the hot line HOT for comparative analysis of the currents and the frequency signals, a first insulation differential amplifier 2-1 composed of a plurality of operational amplifiers U1 to U4 circuit-connected through the first current shunt SH1, a second current shunt SH2 connected to the neutral line NEUTRAL for comparative analysis of the currents and the frequency signals, and a second insulation differential amplifier 2-2 composed of a plurality of operational amplifiers U5 to U8 circuit-connected through the second current shunt SH2. More specifically, the microprocessor U11 is circuit-connected to the triacs (ISO-A) and (ISO-B) in the power control means 1 and is configured to control power supply by the mechanical relay KC, and is circuit-connected to the first insulation differential amplifier 2-1 connected to the hot line HOT through the first current shunt SH1 and the second insulation differential amplifier 2-2 connected to the neutral line NEUTRAL through the second current shunt SH2 and is configured to monitor the currents and the frequency signals of the hot line HOT and the neutral line NEUTRAL.

A first comparator U9, which is connected for comparison to the first insulation differential amplifier 2-1 connected to the hot line HOT through the first current shunt SH1 and the second insulation differential amplifier 2-2 connected to the neutral line NEUTRAL through the second current shunt SH2, is circuit-connected to the microprocessor U11, so that the microprocessor U11 checks the occurrence of ground fault by comparing and detecting the currents flowing through the hot line HOT and the neutral line NEUTRAL.

In addition, a second comparator U10, which is interposed between the microprocessor U11 and the first insulation differential amplifier 2-1 connected to the hot line HOT through the first current shunt SH1, is circuit-connected to the microprocessor U11, so that the microprocessor U11 checks the occurrence of arc fault by comparing and detecting a voltage passing through the first current shunt SH1 of the hot line HOT and an intermediate scale which is an approximate value of voltage swing of a representative signal of the first current shunt SH1 of the hot line HOT.

That is, the microprocessor U11 may check the ground fault by the first comparator U9 and the arc fault by the second comparator U10, and is configured to variably control the power control means 1 by adjusting setting values for each function by its own program.

The present disclosure further includes an analog-to-digital converter U15 composed of a switch mode power supply (smps) connected such that output AC power of the final operational amplifiers U1 to U4 of the first insulation differential amplifier 2-1 connected to the hot line HOT through the first current shunt SH1 is supplied to the microprocessor U11 as DC power.

Furthermore, a pair of first LED CR1 and second LED CR2 are electrically connected to the microprocessor U11. Accordingly, during the occurrence of earth leakage, an overcurrent, an arc, and an inductive load operation, the lighting of the first LED CR1 and the lighting of the second LED CR2 occur differently by the connection structure so as to distinguish and notify the earth leakage, the overcurrent, the arc, and the inductive load operation.

According to the control method of the complex multifunctional relay system configured as above, the triacs (ISO-A and ISO-B) and the mechanical relay KC are circuit-connected by a combination of digital circuits and analog circuits, currents and frequency signals collected by the first current shunt SH1 of the hot line HOT and the second current shunt SH2 of the neutral line NEUTRAL of the AC circuit are analyzed based on the microprocessor U11, and the analyzed currents and frequency signals are compared with setting values for each function, which are preset and stored, by the program of the microprocessor U11 to control the mechanical relay KC of the power control means 1, so that various functions such as an inductive load operation, an overcurrent blocking function, an arc blocking function, and an earth leakage blocking function are complexly performed.

The control method of the complex multifunctional relay system of the present disclosure will be described in more detail. As seen from the flowchart illustrated in FIG. 2, the complex multifunctional relay system is powered on and the microprocessor U11 determines whether an input pin state is changed in the program setting state of the microprocessor U11. When an external control input signal is an on signal, the microprocessor U11 drives the triacs (ISO-A) and (ISO-B). When a voltage difference at both ends of the triacs (ISO-A) and (ISO-B) reaches a predetermined value preset and stored, the microprocessor U11 drives the mechanical relay KC and disconnects the triacs (ISO-A) and (ISO-B) when the phase of a current is zero. On the other hand, when the external control input signal is an off signal in the program setting state of the microprocessor U11, the microprocessor U11 drives the triacs (ISO-A) and (ISO-B). When the voltage difference at both ends of the triacs (ISO-A) and (ISO-B) reaches the predetermined value preset and stored, the microprocessor U11 disconnects the mechanical relay KC and disconnects the triacs (ISO-A) and (ISO-B) when the phase of the current is zero.

Then, the mechanical relay KC is driven as described above and it is determined whether an elapsed time after starting the motor serving as the load 20 is less than 2 seconds. When the elapsed time is less than 2 seconds, the microprocessor U11 continuously monitors ground fault and arc fault states for 2 seconds and compares a motor starting profile preset and stored with a current value of the hot line HOT by the first current shunt SH1. When a predetermined deviation or more occurs, the microprocessor U11 recognizes that it is abnormal to block the current flow of the mechanical relay KC and turns on the first LED CR1 connected to the microprocessor U11 to block a motor starting overcurrent and to provide a warning alarm to an exterior.

On the other hand, when the elapsed time exceeds 2 seconds, the microprocessor U11 continuously monitors ground fault and arc fault states after 2 seconds and compares a normal operating profile preset and stored with the current value of the hot line HOT by the first current shunt SH1. When a predetermined deviation or more occurs, the microprocessor U11 recognizes that it is abnormal to block the current flow of the mechanical relay KC and turns on the second LED CR2 connected to the microprocessor U11 to block an operating overcurrent and to provide a warning alarm to an exterior.

Furthermore, as the result of comparing the current value of the hot line HOT by the first current shunt SH1 with the motor starting profile preset and stored or the normal operating profile preset and stored, when the predetermined deviation or less occurs, the microprocessor U11 recognizes that it is normal. In such a case, the second comparator U10 connected to the hot line HOT through the first current shunt SH1 and the first insulation differential amplifier 2-1 generates a square wave representing a signal frequency of a current sensor and supplies the square wave to the microprocessor U11. Then, the microprocessor U11 compares a high frequency preset and stored for displaying arc fault with a frequency of an incoming signal. When a predetermined deviation or more occurs, the microprocessor U11 recognizes that it is abnormal and blocks the current flow of the mechanical relay KC to block the occurrence of an arc, and turns on the first LED CR1 and the second LED CR2 connected to the microprocessor U11 to provide a warning alarm to an exterior.

In addition, as the result of comparing the high frequency preset and stored for displaying the arc fault with the frequency of the incoming signal, when it is normal, the currents of the hot line HOT and the neutral line NEUTRAL of the AC circuit are compared with each other by the first comparator U9 connected by the first current shunt SH1/the first insulation differential amplifier 2-1 and the second current shunt SH2/the second insulation differential amplifier 2-2 and the compared value is transmitted to the microprocessor U11. The microprocessor U11 monitors the received signal and compares a deviation value between the current value of the hot line HOT and the current value of the neutral line NEUTRAL with a range value preset and stored for displaying ground fault. When the deviation value exceeds the range value, the microprocessor U11 recognizes that it is abnormal and blocks the current flow of the mechanical relay KC to block the occurrence of earth leakage due to the ground fault, and turns on the first LED CR1 and the second LED CR2 connected to the microprocessor U11 to provide a warning alarm to an exterior. In such a case, the lighting of the first LED CR1 and the second LED CR2 during the occurrence of the arc is different from the lighting of the first LED CR1 and the second LED CR2 during the occurrence of the earth leakage.

Furthermore, when the deviation value does not exceed the range value, the microprocessor U11 recognizes that it is normal and returns to the input pin state check step.

According to the complex multifunctional relay system and the control method therefor of the present disclosure, the hybrid relay system can be implemented by combining the digital circuits and the analog circuits to complexly perform various functions, and the microprocessor U11 continuously compares numerical values preset and stored with numerical values detected in realtime and immediately determines whether the current state of a corresponding part is normal or abnormal, so that it is possible to prevent malfunction of the motor serving as the load 20 due to the overcurrent, the earth leakage due to the art fault and the ground fault, and the like or an abnormal operation and breakage of various circuit parts such as the microprocessor U11. As a consequence, it is possible to obtain effects such as durability improvement and long life while improving product functionality and providing differentiated performance with other products.

While various embodiments have been described above, it will be understood to those skilled in the art that the embodiments described are by way of example only. Accordingly, the disclosure described herein should not be limited based on the described embodiments.

According to the present disclosure, it is possible to complexly perform various functions such as overcurrent blocking, arc fault blocking, and earth leakage blocking by one relay system, and the relay system is powered on to continuously monitor a current state all the time and immediately blocks a current flow by the mechanical relay when a problem occurs, thereby preventing malfunction. As a consequence, it is possible to improve product durability and to promote development in various industrial fields where the relay is used.

The invention claimed is:
1. A complex multifunctional relay system comprising:
   a power control means (1) including a plurality of triacs (ISO-A and ISO-B) circuit-connected to a hot line of an

AC circuit that receives AC power through an input terminal (10) and supplies the AC power to a load (20) and a mechanical relay (KC) circuit-connected between the triacs (ISO-A and ISO-B);

a first insulation differential amplifier (2-1) including a plurality of operational amplifiers (U1 to U4) circuit-connected through a first current shunt (SH1) and a second insulation differential amplifier (2-2) including a plurality of operational amplifiers (U5 to U8) circuit-connected through a second current shunt (SH2) in order to compare and analyze currents and frequency signals of the hot line and a neutral line of the AC circuit;

a microprocessor (U11) circuit-connected to the triacs (ISO-A and ISO-B) in the power control means (1) to control power supply by the mechanical relay (KC) and circuit-connected to the insulation differential amplifiers (2-1 and 2-2) installed in the hot line and the neutral line of the AC circuit to monitor the currents and the frequency signals of the hot line and the neutral line;

a first comparator (U9) connected for comparison to the first insulation differential amplifier (2-1) connected to the hot line through the first current shunt (SH1) and the second insulation differential amplifier (2-2) connected to the neutral line through the second current shunt (SH2) and connected to the microprocessor (U11), and configured to check occurrence of ground fault by comparing and detecting the currents flowing through the hot line and the neutral line; and a second comparator (U10) interposed between the first insulation differential amplifier (2-1) connected to the hot line through the first current shunt (SH1) and the microprocessor (U11) and configured to check occurrence of arc fault by comparing and detecting a voltage passing through the first current shunt (SH1) of the hot line and an intermediate scale which is an approximate value of voltage swing of a representative signal of the first current shunt (SH1) of the hot line, wherein the power control means (1) is changed by adjusting setting values for each function by a program of the microprocessor (U11).

2. The complex multifunctional relay system according to claim 1, wherein a pair of first LED (CR1) and second LED (CR2) are electrically connected to the microprocessor (U11), and during occurrence of earth leakage, an overcurrent, an arc, and an inductive load operation, lighting of the first LED (CR1) and lighting of the second LED (CR2) occur differently.

3. A control method of a complex multifunctional relay system, wherein triacs (ISO-A and ISO-B) and a mechanical relay (KC) are circuit-connected by a combination of digital circuits and analog circuits, currents and frequency signals collected by a current shunt of a hot line and a current shunt of a neutral line of an AC circuit are analyzed based on a microprocessor (U11), and the analyzed currents and frequency signals are compared with setting values for each function, which are settable in advance, by a program to control the mechanical relay (KC) of a power control means (1), so that various functions such as an inductive load operation, an overcurrent blocking function, an arc blocking function, and an earth leakage blocking function are complexly performed.

4. The control method according to claim 3, wherein the power control means (1) drives the triacs (ISO-A and ISO-B) when an external control input signal is an on signal in a program setting state of the microprocessor (U11), drives the mechanical relay (KC) when a voltage difference at both ends of the triacs (ISO-A and ISO-B) reaches a predetermined value preset and stored, and disconnects the triacs (ISO-A and ISO-B) when a phase of a current is zero.

5. The control method according to claim 4, wherein the microprocessor (U11) continuously monitors ground fault and arc fault states within 2 seconds after a motor load (20) is started by the driving of the mechanical relay (KC), compares a motor starting profile preset and stored with a current value of the hot line by a first current shunt (SH1), recognizes abnormality when a predetermined deviation or more occurs, blocks a current flow of the mechanical relay (KC) and turns on a first LED (CR1) connected to the microprocessor (U11) to block and warn a starting overcurrent of the motor load (20).

6. The control method according to claim 5, wherein, when the current value of the hot line by the first current shunt (SH1) is normal through the comparison with the motor starting profile or the normal operating profile preset and stored in the microprocessor (U11), a second comparator (U10) connected to the hot line through the first current shunt (SH1) and a first insulation differential amplifier (2-1) generates a square wave representing a signal frequency of a current sensor and supplies the square wave to the microprocessor (U11), and the microprocessor (U11) compares a high frequency preset and stored for displaying arc fault with a frequency of an incoming signal, recognizes abnormality when a predetermined deviation or more occurs, blocks the current flow of the mechanical relay (KC), and turns on the first LED (CR1) and the second LED (CR2) connected to the microprocessor (U11) to block and warn occurrence of an arc.

7. The control method according to claim 6, wherein, when the result of comparing the high frequency preset and stored for displaying the arc fault with the frequency of the incoming signal indicates normality, the currents of the hot line and the neutral line of the AC circuit are compared with each other by a first comparator (U9) connected by the first current shunt (SH1)/the first insulation differential amplifier (2-1) and a second current shunt (SH2)/a second insulation differential amplifier (2-2) and the compared value is transmitted to the microprocessor (U11), and the microprocessor (U11) monitors the received signal and compares a deviation value between a current value of the hot line and a current value of the neutral line with a range value preset and stored for displaying ground fault, recognizes abnormality when the deviation value exceeds the range value, blocks the current flow of the mechanical relay (KC), and turns on the first LED (CR1) and the second LED (CR2) connected to the microprocessor (U11) to block and warn occurrence of earth leakage due to ground fault.

8. The control method according to claim 4, wherein the microprocessor (U11) continuously monitors ground fault and arc fault states after 2 seconds after the motor load (20) is started by the driving of the mechanical relay (KC), compares a normal operating profile preset and stored with a current value of the hot line by a first current shunt (SH1), recognizes abnormality when a predetermined deviation or more occurs, blocks a current flow of the mechanical relay (KC) and turns on the second LED (CR2) connected to the microprocessor (U11) to block and warn an operating overcurrent.

9. The control method according to claim 8, wherein, when the current value of the hot line by the first current shunt (SH1) is normal through the comparison with the motor starting profile or the normal operating profile preset and stored in the microprocessor (U11), a second comparator (U10) connected to the hot line through the first current shunt (SH1) and a first insulation differential amplifier (2-1) generates a square wave representing a signal frequency of a current sensor and supplies the square wave to the microprocessor (U11), and the microprocessor (U11) compares a high frequency preset and stored for displaying arc fault with a frequency of an incoming signal, recognizes abnormality when a predetermined deviation or more occurs, blocks the current flow of the mechanical relay (KC), and turns on the first LED (CR1) and the second LED (CR2) connected to the microprocessor (U11) to block and warn occurrence of an arc.

10. The control method according to claim 3, wherein the power control means (1) drives the triacs (ISO-A and ISO-B) when an external control input signal is an off signal in a program setting state of the microprocessor (U11), disconnects the mechanical relay (KC) when a voltage difference at both ends of the triacs (ISO-A and ISO-B) reaches a predetermined value preset and stored, and disconnects the triacs (ISO-A and ISO-B) when a phase of a current is zero.

* * * * *